United States Patent [19]
Lee

[11] Patent Number: 5,857,624
[45] Date of Patent: Jan. 12, 1999

[54] WINDSHIELD WASHER NOZZLE WITH DRAIN PORT

[75] Inventor: Kil-Woo Lee, Kyunggi-do, Rep. of Korea

[73] Assignee: Hyundai Motor Company, Seoul, Rep. of Korea

[21] Appl. No.: 951,407

[22] Filed: Oct. 16, 1997

[30] Foreign Application Priority Data

Oct. 18, 1996 [KR] Rep. of Korea .................. 1996-46914

[51] Int. Cl.⁶ ..................................................... B05B 1/10
[52] U.S. Cl. ...................... 239/284.1; 239/124; 239/571; 137/391; 137/433
[58] Field of Search ............................. 239/284.1, 284.2, 239/570, 571, 572, 583, 124; 137/433, 391, 872

[56] References Cited

U.S. PATENT DOCUMENTS

| | | | |
|---|---|---|---|
| 178,137 | 5/1876 | Garland | 137/433 |
| 3,141,617 | 7/1964 | Spica | 239/538 |
| 3,491,788 | 1/1970 | Kilayko | 137/433 |

*Primary Examiner*—Andres Kashnikow
*Assistant Examiner*—Lisa Ann Douglas
*Attorney, Agent, or Firm*—Christie, Parker & Hale, LLP

[57] ABSTRACT

A windshield washer nozzle with a drain port is disclosed. In the nozzle with liquid inlet and outlet ports, a partition wall is formed in the middle portion of the passage between the two ports, thus branching a drain port from the main passage. A pressure float valve is movably positioned in the middle portion of the main passage. The valve moves upward or downward under the guide of the partition wall in accordance with the pressure of the liquid in the passage, thus selectively closing the drain port or the passage. The drain port automatically drains the liquid from the nozzle at the end of a liquid ejecting operation, thus allowing the nozzle to be free from any deposits and preventing the nozzle from being blocked or unexpectedly frozen up in cold weather.

1 Claim, 2 Drawing Sheets

WINDSHIELD WASHER NOZZLE WITH DRAIN PORT

BACKGROUND OF THE INVENTION

1. Field of the Invention

The present invention relates, in general, to a windshield washer nozzle for automobiles used for ejecting pressurized washing liquid onto a windshield glass and, more particularly, to a windshield washer nozzle with a drain port for automatically draining liquid from the nozzle at the end of a liquid ejecting operation, thus allowing the nozzle to be free from any deposits and preventing the nozzle from being blocked or unexpectedly frozen up in cold weather

2. Description of the Prior Art

As well known to those skilled in the art, a windshield washer nozzle is used for ejecting pressurized washing liquid onto the windshield glass of a car. In the operation of such a nozzle, washing liquid contained in a tank is pumped through a hose prior to being ejected onto the windshield glass through the nozzle.

FIG. 1 shows the typical position of a windshield washer nozzle of a car. As shown in the drawing, two nozzles 1 for windshield washing liquid are mounted to opposite sides of a hood 3, which are positioned in front of the windshield glass 2. The nozzles 1 eject the pressurized washing liquid onto the windshield glass 2 when a driver in the passenger compartment operates a windshield washing lever.

The construction of a conventional windshield washer nozzle is shown in FIG. 1. As shown in the drawing, the nozzle 1 is comprised of a single body with two ports, that is, a liquid inlet port 1a and a liquid outlet port 1b. In the operation of the above nozzle 1, pressurized washing liquid passes through a washer hose (not shown) and is introduced into the nozzle 1 through the inlet port 1a. The washing liquid is, thereafter, ejected from the outlet port 1b onto a windshield glass 2.

The above nozzle 1 has a simple construction with both the inlet port 1a introducing the liquid into the nozzle 1 and the outlet port 1b discharging the pressurized liquid onto the windshield glass 2. Therefore, washing liquid remains in the nozzle 1 after a liquid ejecting operation of the nozzle 1 is stopped, thus causing deposits to be formed in the nozzle 1 due to an additive or impurities in the remaining liquid. Such deposits may unexpectedly block the outlet port 1b of the nozzle 1, thus causing the port 1b to fail to eject the liquid.

The washing liquid remaining in the nozzle 1 also allows the nozzle 1 to be frozen up in cold weather, thus breaking down or causing an operational error while ejecting washing liquid onto the windshield glass 2.

SUMMARY OF THE INVENTION

Accordingly, the present invention has been made keeping in mind the above problems occurring in the prior art, and an object of the present invention is to provide a windshield washer nozzle, which is provided with a drain port for automatically draining liquid from the nozzle at the end of a liquid ejecting operation, thus allowing the nozzle to be free from any deposits and preventing the nozzle from being blocked or unexpectedly frozen up in cold weather.

In order to accomplish the above object, the present invention provides a windshield washer nozzle for automobiles, comprising: a liquid inlet port formed on the lower end of a nozzle body and connected to a liquid tank through a washer hose, thus selectively introducing pressurized washing liquid into the nozzle body; a liquid outlet port formed on the nozzle body and communicating with the liquid inlet port through a main passage, the liquid outlet port selectively ejecting the pressurized liquid onto a windshield; a partition wall integrally formed in a middle portion of the main passage; a drain port formed on the side wall of the nozzle body and branched from the middle portion of the main passage by the partition wall, thus selectively draining the liquid from the nozzle body when a liquid ejecting operation of the nozzle is stopped; and a pressure float valve movably positioned in the middle portion of the main passage, the valve moving upward or downward under the guide of the partition wall in accordance with the pressure of the liquid in the passage, thus selectively closing the drain port or the passage.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
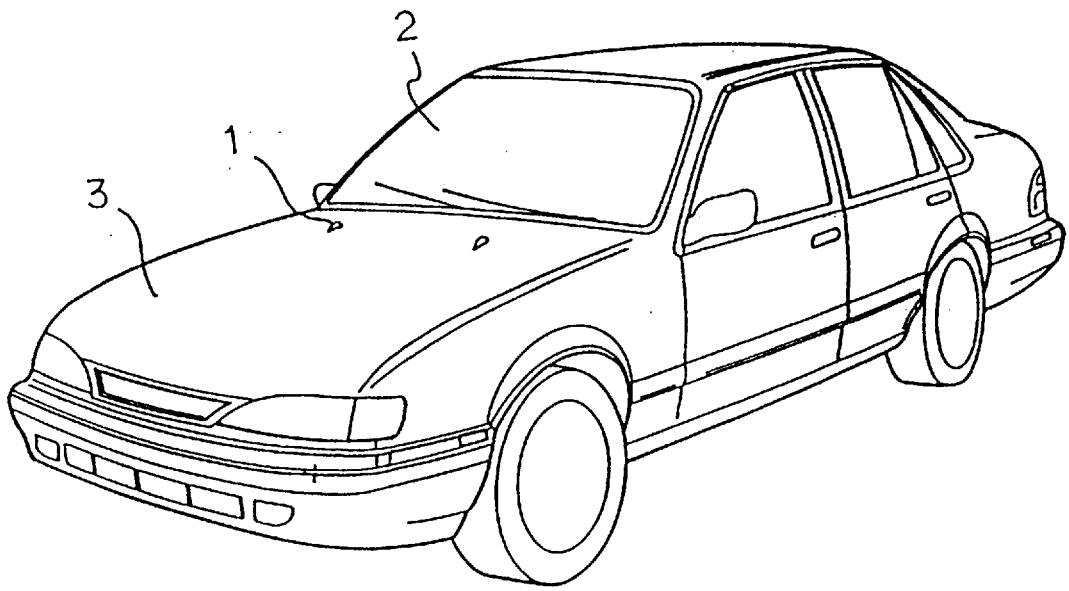
FIG. 1 is a perspective view of a car, showing the conventional position of windshield washer nozzles.
Figure 2:
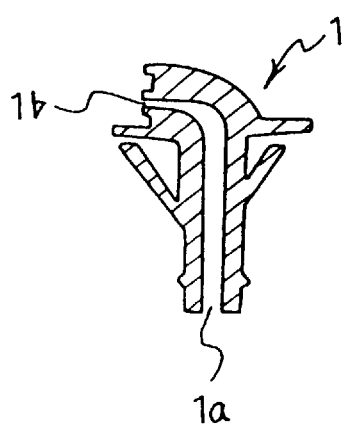
FIG. 2 is a sectional view showing the construction of a conventional windshield washer nozzle.
Figure 3:
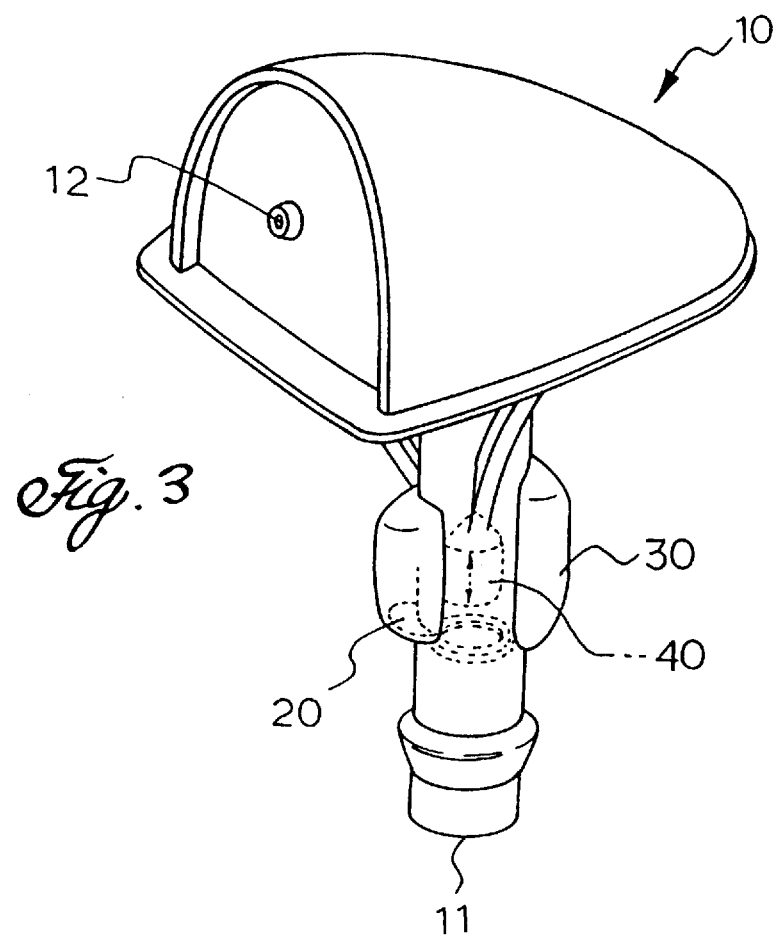
FIG. 3 is a perspective view showing the construction of a windshield washer nozzle with a drain port in accordance with the preferred embodiment of the present invention.
Figure 4:
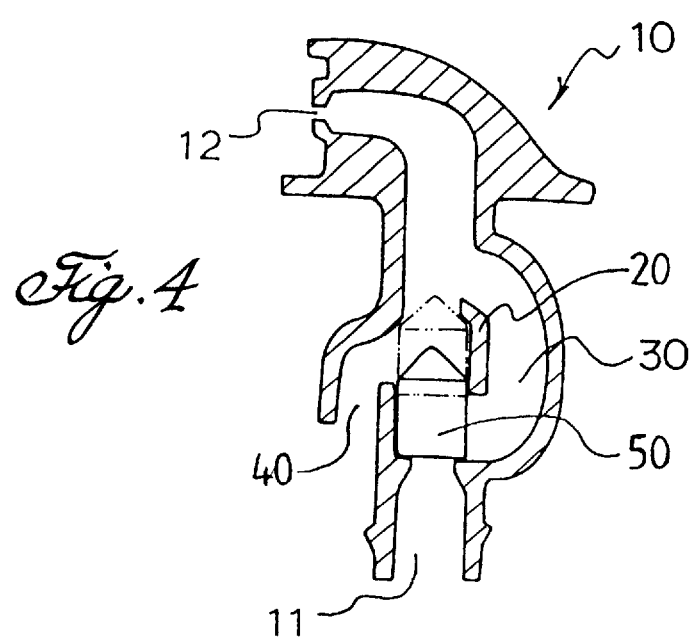
FIG. 4 is a sectional view of the windshield washer nozzle of this invention.

FIG. 3 is a perspective view showing the construction of a windshield washer nozzle with a drain port in accordance with the preferred embodiment of this invention. FIG. 4 is a sectional view of the windshield washer nozzle of this invention. As shown in the drawings, the nozzle 10 of this invention is comprised of a single body with two ports, that is, a liquid inlet port 11 and a liquid outlet port 12 communicating with each other through a main passage 30. The liquid inlet port 11 is connected to a liquid tank through a washer hose (not shown), thus introducing washing liquid into the nozzle 10. The washing liquid is, thereafter, ejected from the outlet port 12 onto a windshield glass. A partition wall 20 is formed in the middle portion of the main passage 30 between the two ports 11 and 12, thus branching a drain port 40 from the middle portion of the main passage 30. The main passage 30 guides the washing liquid from the inlet port 11 to the outlet port 12, while the drain port 40 drains the liquid from the nozzle 10 at the end of a liquid ejecting operation.

The drain port 40 is formed on the side wall of the nozzle 10 and communicates with the upper portion of the main passage 30, with the outlet end of the drain port 40 being directed downwardly.

A pressure float valve 50 is movably positioned in the middle portion of the passage 30. The valve 50 moves upward or downward in accordance with the pressure of the washing liquid in the passage 30, thus selectively closing the drain port 40 or the passage 30.

The partition wall 20 guides such a vertical movement of the valve 50 and forms the inlet end of the drain port 40 in cooperation with the side wall of the nozzle 10, thus allowing the valve 50 to selectively close the drain port 40 when the valve 50 is in its lifted position.

The operational effect of the above washer nozzle 10 will be described hereinbelow.

When the nozzle 10 is not operated, the pressure float valve 50 is in its lowered position due to its own weight, thus closing the passage 30 and opening the drain port 40 as shown by the solid line of FIG. 4.

When a driver operates a windshield washing lever, pressurized washing liquid is introduced into the nozzle 10 through the inlet port 11 while lifting the valve 50 up as shown by the phantom line of FIG. 4, thus closing the drain port 40 and opening the passage 30. Therefore, the pressurized liquid passes through the passage 30 prior to being ejected from the outlet port 12 onto the windshield glass.

When the liquid ejecting operation of the nozzle 10 is stopped, the inner pressure of the passage 30 is gradually reduced and so that the valve 50 is lowered due to its own weight, thus closing the passage 30 and opening the drain port 40 as shown by the solid line of FIG. 4. Therefore, the liquid, remaining in the nozzle 10, is drained to the outside of the nozzle 10 through the drain port 40.

That is, the windshield washer nozzle 10 with the drain port 40 of this invention automatically drains washing liquid from the nozzle 10 through the drain port 40 at the end of a liquid ejecting operation. Therefore, the nozzle 10 is free from any deposits and is prevented from being blocked or unexpectedly frozen up in cold weather.

As described above, the present invention provides a windshield washer nozzle with a drain port. The drain port automatically drains liquid from the nozzle at the end of a liquid ejecting operation, thus allowing the nozzle to be free from any deposits and preventing the nozzle from being blocked or unexpectedly frozen up in cold weather.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A windshield washer nozzle for automobiles, comprising:

a liquid inlet port formed on the lower end of a nozzle body and connected to a liquid tank through a washer hose, thus selectively introducing pressurized washing liquid into the nozzle body;

a liquid outlet port formed on the nozzle body and communicating with said liquid inlet port through a main passage, said liquid outlet port selectively ejecting the pressurized liquid onto a windshield;

a partition wall integrally formed in a middle portion of said main passage;

a drain port formed on the side wall of said nozzle body and branched from the middle portion of said main passage by the partition wall, thus selectively draining the liquid from the nozzle body when a liquid ejecting operation of the nozzle is stopped; and a pressure float valve movably positioned in the middle portion of said main passage, said valve moving upward or downward under the guide of said partition wall in accordance with the pressure of the liquid in the passage, thus selectively closing the drain port or the passage.

\* \* \* \* \*